Oct. 3. 1933.  H. ENARD  1,929,058
SPEED REDUCER
Filed March 6, 1933
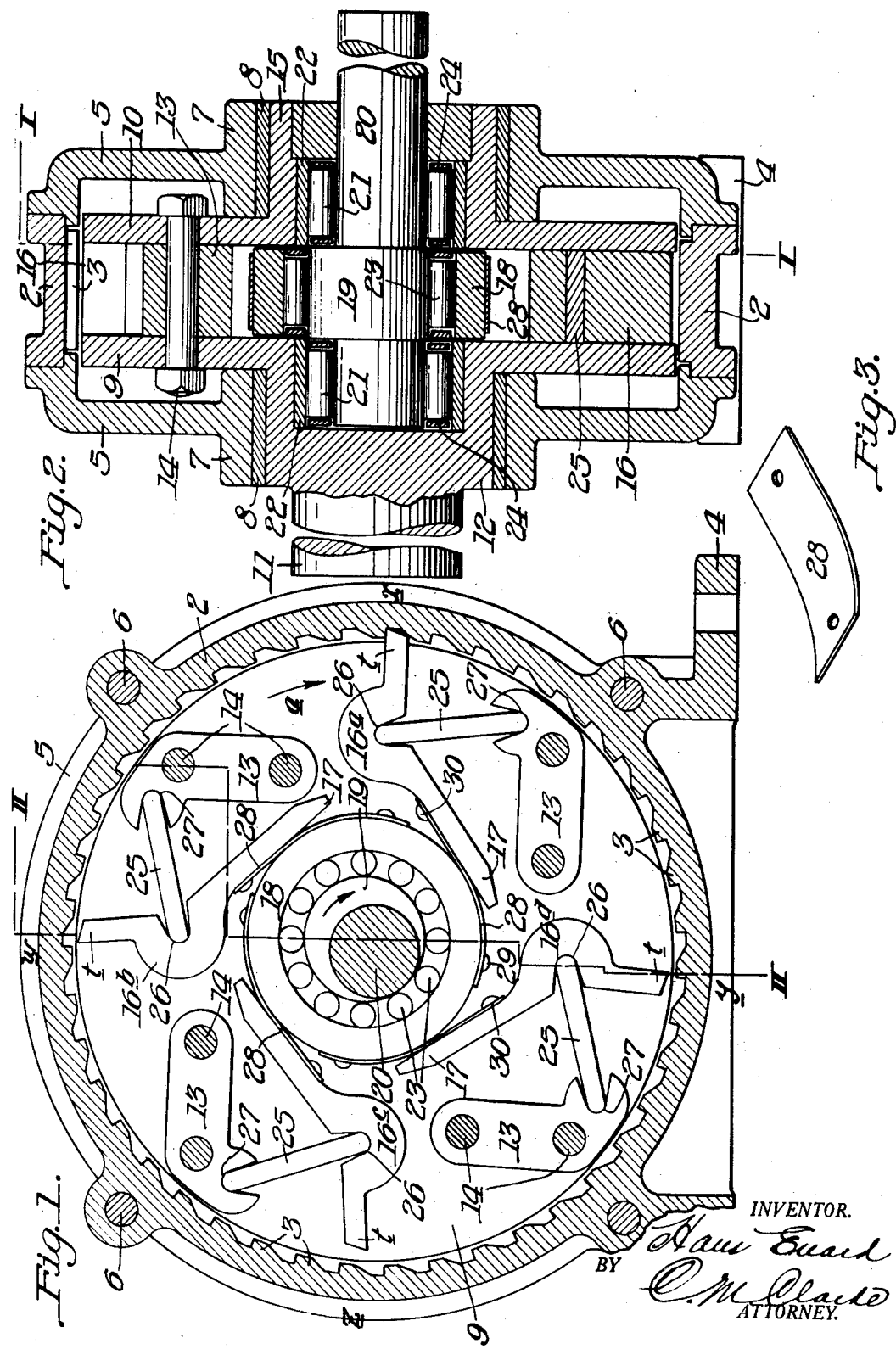

Patented Oct. 3, 1933

1,929,058

UNITED STATES PATENT OFFICE 1,929,058

SPEED REDUCER

Hans Enard, Elizabeth, N. J.

Application March 6, 1933. Serial No. 659,771

10 Claims. (Cl. 74—54)

My invention consists of an improvement in speed reducers for the purpose of transmitting motion from a high speed drive shaft to a low speed driven or power transmitting shaft. It involves an annular rack of the ratchet tooth type, a disk or disks connected with the driven shaft, a series of actuating levers operably engaging the rack and one or both of said disks, and a lever-actuating element operated by the drive shaft adapted to successively effect rack engagement by the levers for continuous slow motion transmission to the driven shaft disk.

One preferred construction of the invention is shown in the accompanying drawing, in which:

Fig. 1 is a central vertical section through the device on the line I—I of Fig. 2;

Fig. 2 is a cross section on the line II—II of Fig. 1;

Fig. 3 is a detail view in perspective showing the lever-controlling spring.

In constructing the device for use as a fixed unit, an annular rack member 2 is provided with a series of inner annular ratchet teeth 3 and with means for fixedly mounting on a supporting base or frame, as by integral flanges 4, for bolt connection, as in Fig. 1. For convenient mounting of the working parts an outer casing consisting of embracing sides 5, 5, is clamped to opposite sides of annular rack member 2 by bolts 6 and provided with hubs 7 forming, with bushings 8, journal bearings for the rotating hollow hubs of a driven disk or head 9 and its companion disk or head 10. Disk 9 is provided with a centrally extending driven shaft 11 preferably integral with the disk through a concentrically hollow hub 12. Disk 10 is spaced from disk 9 by intervening movement-imparting bearing members 13 fixedly held between the disks by connecting bolts 14, disk 10 acting as a balancing member and having a hub 15 journalled like hub 12 in journal bushing 8 at the opposite side.

The actuating elements for transmitting movement to the driven shaft 11 are a series of pawl-like levers 16a, 16b, 16c and 16d each having a tooth-engaging terminal t adapted to move over and then interfit with and engage one of the ratchet teeth 3 successively throughout the series of levers, as each lever is successively actuated.

For such purpose the inner end 17 of each lever 16 extends inwardly towards and is in operative engagement with the periphery of a non-rotating floating ring 18 adapted to be actuated in an eccentric path by rotation of an eccentric 19 of driving shaft 20.

As hereinafter described, lever terminal 17 is continuously held against the periphery of ring 18 by action of spring 28, preferably intervening between the ring and the lever. The driving shaft 20 is preferably journalled at each side of the eccentric between annular series of roller bearings 21 engaging bushings 22 seated within each hub 12 and 15, as in Fig. 2.

Between the eccentric 19 and floating ring 18 is a similar annular series of roller bearings 23, all of said roller bearing series being annularly mounted in the usual retaining and spacing rings 24.

Between each lever 16 and its adjacent abutment 13 is interposed a fulcrum-providing thrust pin, link or plate 25, engaging by its rounded terminals socket 26 of lever 16 and a similar socket 27 of the abutment 13, with sufficient play to permit of slight accompanying lateral movement. Each lever 16 is provided with a spring 28, of spring steel leaf form, secured by a screw or other suitable means 29 to the face of the ring 18, and engaging the inner face of the lever arm 17 by a similar screw or stud 30.

Spring 28, when applied in the manner shown, is curved or flexed, and constantly tends to hold the arm 17 inwardly against the ring 18, with the spring intervening, so as to insure positive action of the eccentrically actuated ring without lost motion.

As thus constructed the outer terminal of the lever 16, when in engagement with the shouldered end of one of the ratchet teeth 3, constitutes the fulcrum of the lever, the weight or power being applied through stud 25 against abutment 13, as the floating ring 18 moves outwardly against the normally retracted lever. The effect of such operation is to impart a slight rotative movement to such particular abutment and to the disks 9 and 10, with corresponding rotation by disks 9 and 10 to driven shaft 11.

It will be observed that throughout the series of ratchet teeth 3 but one lever is in actual operative engagement with one of the teeth, the several other lever terminals being in graduated contact or spaced relation thereto, throughout the series.

Thus, as the floating ring 18 is caused to move outwardly around and in conformity with the movement of eccentric 19, each of said levers, one after the other, is brought successively into contact and is operatively impelled for a fraction of a tooth space, such movement comprising in its entirety a complete one tooth space movement of disks 9 and 10 for each rotation of the driving shaft 20.

The number of teeth 3 in the annular series is preferably or purposely one tooth less in number than any arbitrary number equally divisible by the number of ratchet levers 16. Thus in the construction shown there are provided forty-three teeth.

In adapting the invention to larger or smaller diameters, the total number of teeth is one less than any number divisible by a common divisor equalling the number of pawl levers.

By such arrangement equal spacing of the abutments and their actuating levers and link connections around the driven disk is most conveniently adopted, the number of ratchet teeth thus preferably selected always providing for proper successive engagement by the lever terminals, successively. In operation the disks 9 and 10 rotate in the same direction as that of driving shaft 20, or as shown in a clockwise direction.

Thus, assuming the terminal $t$ of lever 16b has moved the driven disk 9 in the direction of arrow $a$ by thrust or fulcrum engagement against the tooth end, and has been retracted, as at $w$, say for one quarter of the length of the tooth, such movement will have been effected initially by outward movement of ring 18, followed by spring retraction. Then the terminal of the next following lever 16c will have been advanced correspondingly, at at $z$, by spring retraction towards the receding ring 18 and will be inserted in due course behind its adjacent tooth 3 for operation thereagainst upon outward movement of the eccentrically actuated ring 18, the disks 9, 10, being shifted proportionately by the engaging lever 16a, as at $x$.

The next following lever terminal will have also advanced correspondingly by such successive movement of the disk to the position $y$, and will be in tooth engaging position upon completion of the movement of active lever 16a.

As shown, lever 16b is on the highest point or at the outermost position of eccentric 19 and is already about one-eighth of a tooth space revolution past the end of its preceding actual working stroke of one-quarter tooth space, and is receding from tooth engagement.

At such time lever 16a is at the middle of its working stroke, having already shifted the disks about one-eighth of a tooth space. The next active lever 16d is moving towards and will be in tooth engagement upon completion of the remainder of the stroke of lever 16a.

In other words, assuming the previous movement effected by lever 16a at the $x$ location is succeeded by the following lever action at the $y$ location, the disks carrying all of the levers will be successively and continuously rotated to the extent of one entire ratchet tooth, including advancing movement of lever 16c at the $z$ location, and the final step at the $w$ location.

Thus one entire tooth space movement of the disks will be effected by their series of such fractional movements during one complete rotation of eccentric 19 and the resulting complete annular movement of its eccentrically actuated floating ring 18.

It will be understood also that the depth of the teeth is relative and properly proportioned to the eccentricity of the imparting movement, and that the pawl terminals $t$ shall be properly designed for operative engagement.

The construction and operation of the invention will be readily understood from the foregoing description. Assuming a total of forty-three teeth, i. e., 4×11−1, each rotation of driving shaft 20 will rotate the driven shaft 11 1/43 of a revolution, or one complete revolution for each forty-three revolutions of the driving shaft. It will be understood of course that the extent or degree of reduction may be varied within wide limits by increase or decrease of the diameter of the ratchet tooth ring 2, with corresponding increase or decrease, if desirable and within the available space, of the several sets of operating lever mechanisms.

The device is comparatively simple, cheap to manufacture, not liable to get out of order, and very compact in construction, and provides a direct-acting speed reducer available for connection and application in any of the various uses to which such devices are put.

What I claim is:

1. A speed reducer comprising an outer stationary ring provided with an inner annular series of ratchet teeth, a disk rotatably mounted within said ring having a power imparting extension, a series of integral teeth-engaging levers fulcrumed on the disk and having pawl terminals adapted to successively engage the ratchet teeth, a floating ring engaging the levers, a spring for each lever connecting the lever with the floating ring, and a drive shaft having an eccentric within the floating ring for imparting movement thereto.

2. A speed reducer comprising an outer stationary ring provided with an inner annular series of ratchet teeth, a disk rotatably mounted within said ring having a power imparting extension, a series of integral teeth-engaging levers each having a movable fulcrum member operatively engaging the disk and a pawl terminal adapted to successively engage the ratchet teeth, a floating ring engaging the levers, a spring for each lever connecting the lever with the floating ring, and a drive shaft having an eccentric within the floating ring for imparting movement thereto upon rotation of the shaft.

3. In a speed reducer, the combination of an outer casing having an inner series of annular ratchet teeth, a power transmitting shaft concentrically journalled in the casing having a head, a series of integral levers fulcrumed on the head for inward and outward swinging movement having outer terminals adapted to successively engage the ratchet teeth and provided with inner swinging terminals, a central drive shaft having an eccentric, and a floating ring surrounding the eccentric in operative engagement with the inner terminals of the levers.

4. In a speed reducer, the combination of an outer casing having an inner series of annular ratchet teeth, a power transmitting shaft concentrically journalled in the casing having a head, a series of integral levers fulcrumed on the head having ratchet teeth-engaging terminals, a central drive shaft having an eccentric, a floating ring surrounding the eccentric in operative engagement with the levers, and a leaf spring between and secured to the floating ring and each lever.

5. In a speed reducer, the combination of an outer casing having an inner series of annular ratchet teeth, a power transmitting shaft concentrically journalled in the casing having a head, a series of integral levers fulcrumed on the head having ratchet teeth-engaging terminals, a central drive shaft journalled in the casing and in the head of the power transmitting shaft respectively having an eccentric, a floating ring surrounding the eccentric in operative relation to the levers, and a leaf spring between the floating ring and the levers for each lever connecting the lever with the floating ring and holding each lever in close operative relation to the ring.

6. In a speed reducer, the combination of an outer casing having an inner series of annular ratchet teeth, a power transmitting shaft concentrically journalled in the casing having a head, a companion head spaced therefrom and oppositely journalled in the casing, a series of integral levers fulcrumed between the heads each having a terminal adapted to successively engage the ratchet teeth, a central drive shaft extending through the companion head having an eccentric, a floating ring surrounding the eccentric and in operative engagement with the levers, and a leaf spring between the ring and each lever secured to each member and holding each lever in close operative relation to the ring.

7. In a speed reducer, the combination of an outer casing having an inner series of annular ratchet teeth, a power transmitting shaft concentrically journalled in the casing having a head, a series of fulcrum member bearings on the head, laterally swinging fulcrum members therein, a series of integral levers engaging said members each having a terminal adapted to successively engage the ratchet teeth, a floating ring in operative relation to the several levers, and a drive shaft having an eccentric within the floating ring for imparting motion thereto upon rotation of the shaft.

8. In a speed reducer, the combination of an outer casing having a middle portion provided with an inner series of annular ratchet teeth, a pair of spaced apart heads journalled in the casing, one having a power imparting shaft, fulcrum bearings between the disks, integral ratchet-teeth-engaging levers, laterally swinging fulcrum members therefor engaging the bearings, a central drive shaft having an eccentric, and a floating ring surrounding the eccentric in operative relation to the several levers.

9. In a speed reducer, the combination of an outer casing having a middle portion provided with an inner series of annular ratchet teeth, a pair of spaced apart heads journalled in the casing, one having a power imparting shaft, fulcrum bearings between the disks, integral ratchet-teeth-engaging levers, fulcrum members therefor engaging the bearings, a central drive shaft having an eccentric, a floating ring surrounding the eccentric in operative relation to the several levers, and a leaf spring between the ring and each lever connecting each lever with the floating ring.

10. In speed reducer construction, the combination with an outer stationary annular ratchet tooth member and a central rotatable eccentric, of a floating ring surrounding the eccentric, a driven shaft having a head, a series of ratchet teeth levers pivoted on the head having operating arms around the ring in operative relation thereto, and a retracting leaf spring connecting each lever to the ring and having fixed connection with said members.

HANS ENARD.